United States Patent
Joshi et al.

(10) Patent No.: US 11,240,539 B1
(45) Date of Patent: Feb. 1, 2022

(54) REPORTING OF ENGAGED VIEWS OF DIRECTED CONTENT

(71) Applicant: Amazon Technologies, Inc., Seattle, WA (US)

(72) Inventors: Salil Joshi, Fremont, CA (US); Ala Kallel, Atherton, CA (US); Yi Yao, Bellevue, WA (US); Garrett Alan Dargan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 16/889,583

(22) Filed: Jun. 1, 2020

(51) Int. Cl.
*H04N 7/10* (2006.01)
*H04N 21/234* (2011.01)
*H04N 21/431* (2011.01)

(52) U.S. Cl.
CPC . *H04N 21/23424* (2013.01); *H04N 21/23418* (2013.01); *H04N 21/4316* (2013.01)

(58) Field of Classification Search
CPC ............... H04N 21/84; H04N 21/8153; H04N 21/44513; H04N 21/431; H04N 21/44222; H04N 21/21805; H04N 21/42203
USPC .......................... 725/35, 37, 131, 12, 32, 116
See application file for complete search history.

(56) References Cited

U.S. PATENT DOCUMENTS

| | | | |
|---|---|---|---|
| 2010/0192219 A1* | 7/2010 | Carvajal | H04N 21/431 726/19 |
| 2019/0149851 A1* | 5/2019 | Chang | H04N 21/21805 725/116 |

* cited by examiner

*Primary Examiner* — Jivka A Rabovianski
(74) *Attorney, Agent, or Firm* — Eversheds-Sutherland (US) LLP (57) ABSTRACT

Technologies are provided for reporting engaged impressions of directed content. Some embodiments include a computing device that can initiate a screensaver session within a content streaming service. The computing device also can cause presentation of a directed content asset on a display device functionally coupled to the computing device. The computing device can then update a queue to add a record of an impression of the directed content asset, where the queue is retained in a memory device of the computing device. The computing device can receive a signal indicative of user activity. The computing device can determine, using the queue, that the impression of the directed content asset occurred within a defined time interval relative to a time that the user activity occurred. The computing device can then send data identifying the directed content asset.

20 Claims, 7 Drawing Sheets

REPORTING OF ENGAGED VIEWS OF DIRECTED CONTENT

BACKGROUND

Traditional digital advertisement placement in desktop computers or mobile devices are an active experience in that it can be ascertained that an end-user is viewing or otherwise interacting with at least a portion of the digital media displayed when the advertisement is shown. Accordingly, viewability of the advertisement is well defined because no additional validation is needed beyond the standard definition of viewable impression in order to determine with reasonable certainty that an impression indeed qualifies as a viewable impression.

There are situations, however, when it is difficult to ascertain that an impression has been viewed. For example, a screensaver within a connected television service is a passive experience in that the screensaver begins after some idle time and, thus, it cannot be ascertained that an end-user is viewing a display screen when an advertisement may be shown as part of the screensaver. As a result, the viewability of that advertisement may not conform to the standardized definition of viewable impression.

Therefore, much remains to be improved in the technologies for determining with reasonable certainty that an advertisement has a higher likelihood of qualifying as a viewable impression, and for reporting such a viewable impression as part of a content streaming service.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

DETAILED DESCRIPTION

The disclosure recognizes and addresses, among other technical challenges, the issue of determining with reasonable certainty that presentation of directed content qualifies as a viewable impression. The disclosure introduces engaged impressions in a content streaming service. Embodiments of this disclosure, individually or in combination, provide mechanisms to report engaged views to an attribution server or other types of servers within an advertisement distribution platform. As is described in greater detail below, an engaged view is an impression of directed content that has been shown in a display device for at least a threshold amount of time (one second, for example) and satisfies an engagement criterion for ascertaining that the advertisement impression was viewed. The engagement criterion can dictate, in one example, that a user action has occurred during a defined period relative to the impression. Thus, an engaged view can rely on user activity as a factor to determine viewability—namely, a level of certainty that a directed content impression has been viewed.

In some cases, engaged impressions can be reported collectively rather than individually. To that end, a device that provides the content streaming service can generate a queue of impression records for a series of impressions during a screensaver session, for example. When the device receives a signal indicative of user activity, the device can identify one or several impressions from the queue and can then report the impression records contained in the queue. Those records can be reported to an attribution server or another type of device in a platform for distribution of directed content. In cases in which the screensaver session ends without the device receiving such a signal, the device can discard the records contained in the queue.

Figure 1:
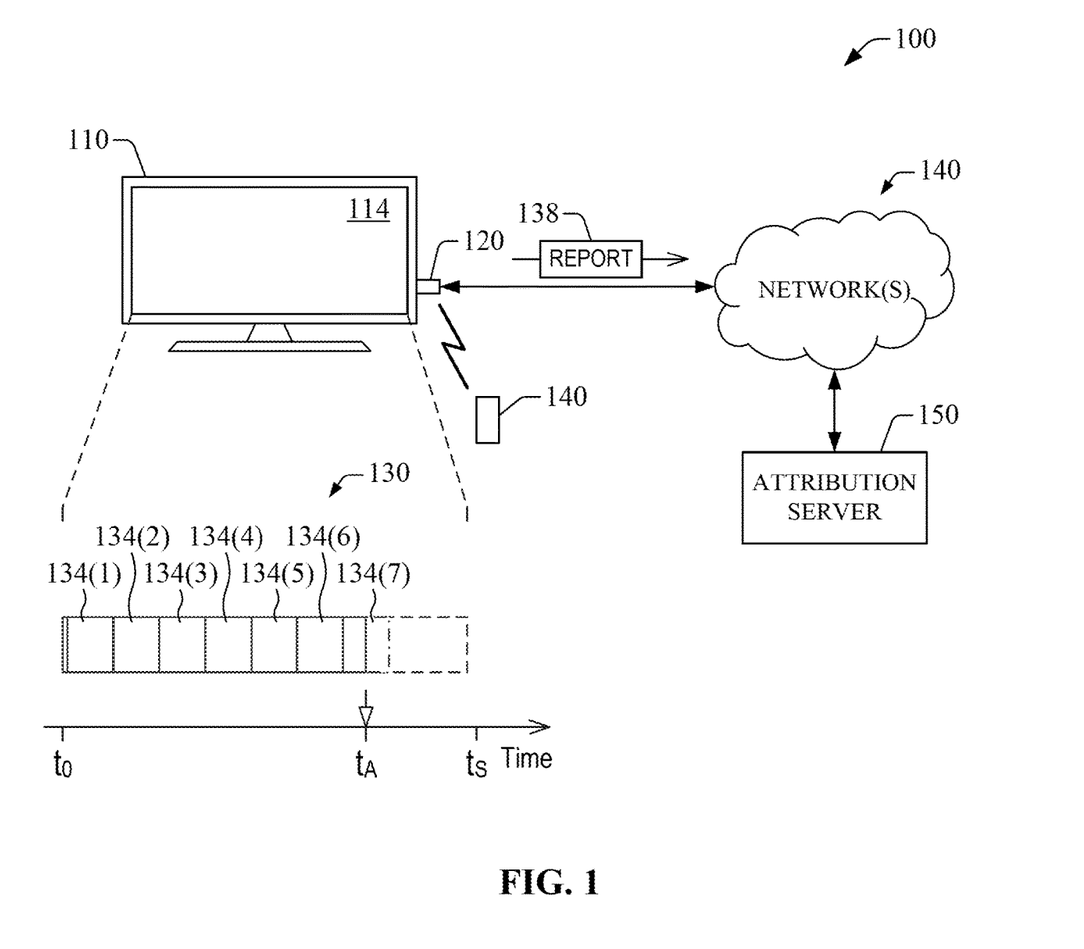
FIG. 1 illustrates an example of an operational environment for the reporting of engaged impressions of directed content, in accordance with one or more embodiments of this disclosure.

With reference to the drawings, FIG. 1 illustrates an example of an operational environment 100 for reporting engaged impressions, in accordance with one or more embodiments of this disclosure. As is illustrated, the operational environment 100 can include a television set 110 that is functionally connected to a computing device 120 that can provide digital content within a content streaming service. The digital content can one or several source devices (not depicted in FIG. 1), and can include digital audio, digital images, digital video, or a combination thereof. The television set 110 and the computing device 120 can thus provide a service that may be referred to as connected television service.

The presentation of digital content on a display device 114 integrated into the television set 110 can be controlled using a remote-control device 140, for example. The remote-control device 140 can be functionally coupled to the computing device 120 via wireless links, for example. The remote-control device 140 can include, in some embodiments, a keypad having keys corresponding to respective operations. An end-user (not depicted in FIG. 1) can control the presentation of digital content on the display device 114 by actuating a button in the keypad. In some embodiments, the remote-control device 140 can include another type of control interface besides a keypad. That control interface can be configured to receive user input (e.g., a touch, a swipe, a gesture, voice command, or similar) identifying a desired operation that controls presentation of the digital content and/or operation of the television set 110. The remote-control device 140 need not be a dedicated device. In some embodiments, the remote-control device 140 can be user activity comprises an interaction with a wireless device (e.g., a smartphone, a tablet computer, or similar) configured to control presentation of the digital content on the display device 114. For instance, the wireless device can include a software application or other type of program code that permits controlling the presentation of digital content.

Regardless of the particular type of control interface, the remote-control device 140 can send a control signal to the computing device 120 in response to an operation selected on the remote-control device 140. The operation can include, for example, power on, power off, volume up, volume down, pause, trick play, or similar. The control signal can thus represent user activity and can constitute a presence signal indicative of presence of an end-user near the television set 110.

Figure 2:
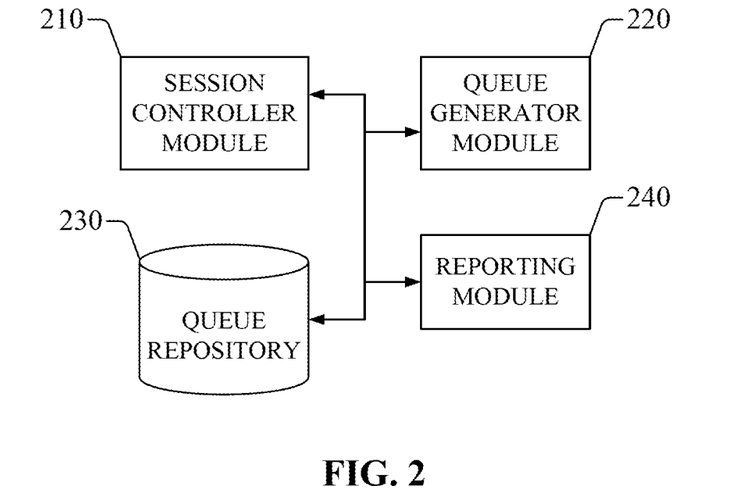
FIG. 2 illustrates an example of a computing architecture for the reporting of engaged impressions of directed content, in accordance with one or more embodiments of this disclosure.

As part of providing the content streaming service, that computing device 120 can initiate a screensaver session after a defined period of service inactivity. For instance, the computing device 120 can initiate the screensaver session after being in an idle state for the defined period (e.g., five minutes). Simply as an illustration, the idle state can be a state in which the computing device 120 is energized and does not supply digital content for presentation on the display device 114 as part of the streaming service. In some embodiments, as is illustrated in FIG. 2, the computing device 120 can include a session controller module 210 that can initiate the screensaver session.

Back to FIG. 1, during the screensaver session, the computing device 120 can cause the display device 114 to present generic content that is independent from the digital content provided as part of the content streaming service. Such generic content can include digital media pertaining to a particular topic (e.g., landscapes, sports, fauna, or user-supplied images). In one example, such digital media can be embodied in photos, drawings, or other types of still images of landscapes. In one configuration, the still images can be presented consecutively, where each image is presented for a respective defined duration, e.g., 30 seconds, 60 seconds, 90 seconds, or similar.

In some embodiments, the screensaver session can be utilized to present directed content instead of, or in addition to, generic content. Thus, in those embodiments, the computing device 120 can cause presentation of a series of directed content assets in the display device 114 integrated into the television set 110, during the screensaver session. Directed content refers, for example, to digital media configured for a particular audience and/or a particular outlet channel, such as a website, a streaming service, or a mobile application. Directed content can include, for example, digital media of various types, such as advertisement; surveys or other types of questionnaires; game challenges or riddles; motion pictures, animations, or other types of video segments; video games; podcasts; audio segments of defined durations (ringtones, songs, etc.); and the like.

The series of directed content assets can be presented according to an impression allocation defining a total number of time slots available for presentation of directed content assets during the screensaver session. For example, the total number of slots can be 9 or 15. The impression allocation can be specific to the screensaver session and, in some embodiments, different screensaver session can have different respective impression allocations.

The series of directed content assets can be presented consecutively, without generic content intercalated between a first directed content asset and a second directed content asset. Simply as an illustration, as is shown in diagram 130, the series of directed content assets that is presented can include a directed content asset corresponding to an impression 134(1), a directed content asset corresponding to an impression 134(2), a directed content asset corresponding to an impression 134(3), a directed content asset corresponding to an impression 134(4), a directed content asset corresponding to an impression 134(5), a directed content asset corresponding to an impression 134(6), and a directed content corresponding to an impression 134(7). In some embodiments, the session controller module 210 (FIG. 2) can obtain the directed content assets from a source device (not depicted in FIG. 1) remotely located relative to the computing device 120. The directed content assets can be obtained by means of one or many of the network(s) 140.

After the presentation of a directed content asset within the screensaver session, the computing device 120 can update a queue to add a record of an impression of the directed content asset. The computing device 120 can further update the queue to add a record of a viewable impression of the directed content asset. The record of the viewable impression can be added after a specific presentation time interval, such as one second. To that end, the computing device 120 can include a query generator module 220 (FIG. 2) in some embodiments. The query generator module 220 can retain the records composing the queue within a queue repository 230.

Further to updating the queue, the computing device 120 can determine if a signal representative of user activity is received at the computing device 120. In some instances, the computing device 120 can determine that such a signal is absent. In response, the computing device 120 can determine if the impression allocation for the current screensaver session has been exhausted. In response to the computing device 120 determining that the impression allocation has not been exhausted, the computing device 120 can cause presentation of another directed content asset in the series of directed content assets. The session controller module 210 (FIG. 2) can determine if the signal representative of user activity is received. This signal may be indicative of user interaction with the remote-control device 140, that is, the receipt of user input by means of the remote-control device 140. In other embodiments, the signal may be indicative of user activity or input provided directly to the computing device 120, such as an audible command or input.

The session controller module 210 also can determine if the impression allocation has been exhausted. In response to the computing device 120 determining that the impression allocation has been exhausted, the computing device 120 can terminate presentation of directed content assets. The computing device 120 can then discard the record(s) in the queue. Upon discarding the record(s), or after the queue has been discarded, the computing device 120 can transition to a low-power state (e.g., a sleep state).

In some situations, the computing device 120 can detect a signal indicative of user engagement with the remote-control device 140, after the queue has been updated. In other situations, the computing device 120 can receive another signal indicative of user activity by receiving user input directly at the computing device 120, for example. Both of those signals can indicate user presence in proximity of the computing device 120. In some situations, the user engagement with the remote-control device 140 can be responsive to a call-to-action button, or another type of selectable visual element, included in the impression of the directed content asset. Simply as an example, the impression 134(4) can include a selectable visual element identifying an action (e.g., "Buy now!" or "Learn More"). In response, the computing device 120 can detect a signal indicative of selection of the selectable visual element. Such a selection represents user activity and can be effected by means of a particular input (e.g., application of pressure, such as touch or swipe) on the remote-control device 140.

As is shown in the timeline in diagram 130 in FIG. 1, such signals can be received at a time $t_A$ (a real number in units of time). In response, the computing device 120 can identify, within the updated queue, each impression within a defined time interval $\Delta\tau$ (a real number in units of time) relative to $t_A$. In some embodiments, the queue generator module 220 (FIG. 2) can identify such impressions. The magnitude of $\Delta\tau$ can be configurable and can range from about 0 (e.g., a few milliseconds) to about, for example, 15 minutes. In one example, the magnitude of $\Delta\tau$ can be less than one minute and greater than one second. In another example, the magnitude of $\Delta\tau$ can be one of one minute, two minutes, three minutes, or five minutes. In some configurations, $\Delta\tau$ can be equal to the duration $t_S$ (a real number in units of time) of the screensaver session. In those configurations, the computing device 120 can identify impression 134(1), impression 134(2), impression 134(3), impression 134(4), impression 134(5), impression 134(6), and impression 134(7) schematically shown in diagram 130.

The computing device 120 can then report at least one of the identified impressions—e.g., one of the identified impressions, more than one of the identified impressions, or all the identified impressions. The computing device 120 can report an identified impression by sending, for example, data identifying the directed content asset (an advertisement, for example) corresponding to the identified impression. The data can include a code that uniquely identifies the directed content asset. The code can be a universally unique identifier (UUID), for example. The computing device 120 can send data identifying a group of impressions to an attribution server device 150 within a directed content distribution platform, for example. The data can be referred to as report 135 and can be sent to the attribution server device by means of one or more networks 140. The computing device 120 also can send the report 135 to other types of devices besides the attribution server device. In some embodiments, as is shown in FIG. 2, the computing device 120 can include a reporting module 240 that can report the identified impression as is described herein.

As is illustrated in diagram 130 in FIG. 1, the time $t_A$ at which user activity occurs can be prior to the time $t_S$ at which the screensaver session is scheduled to end. In some situations, the user activity can cause the termination of the screensaver session. More specifically, the computing device 120 can receive the signal and, in response, can cause the session controller module 210 (FIG. 2) to terminate the screensaver session. In those situations, the presentation of directed content on the display device 114 is terminated. In other situations, the user activity does not result in the termination of the screensaver session. In those other situations, when $\Delta\tau$ is equal to $t_S$–$t_0$ (the duration of the screensaver session) the computing device 120 can transition to a per-impression reporting modality after sending the report 135. In such a modality, the computing device 120 can send data indicative of a directed content asset after an impression (and, in some cases, after a viewable impression) of the directed content asset.

In some instances, an end-user can interact with the remote-control device 140, such as selecting a particular key or button on the remote-control device 140 that controls volume, and the screensaver session may remain active. For instance, the particular key can be a home button or a button to supply a verbal command to an intelligent assistant device. In some embodiments, such an intelligent assistant device can be external to the computing device 120. In other embodiments, the intelligent assistance device can be provided, at least partially, by the computing device 120 and/or the remote-control device 140. In those instances, the screensaver session may proceed throughout the duration of the screensaver session notwithstanding the user activity. In order to account for that type of user activity, the session controller module 210 can use a screensaver termination event as a reference to determine a time interval that elapsed since the selection of the particular key. In cases in which such a time interval is less than a defined time period, the session controller module 210 can determine that user activity was present. The session controller module 210 can identify one or several (or all) impressions for reporting based on the termination, and can then direct the reporting module 240 to send data identifying directed content assets corresponding to the identified impression(s).

Figure 3:
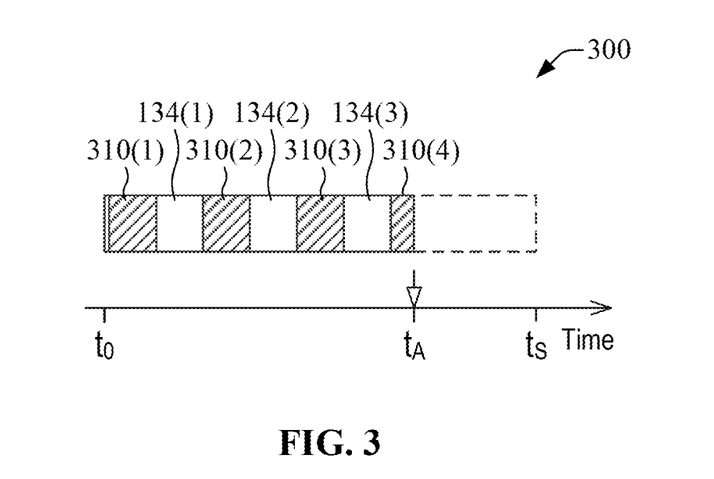
FIG. 3 illustrates an example of presentation of directed content intercalated with non-directed content during a screensaver session, in accordance with one or more embodiments of this disclosure.

The reporting techniques of this disclosure are not limited to a series of consecutive impressions of respective directed content assets, without presentation of non-directed media. Indeed, in some embodiments, non-directed media can be presented between subsequent presentations of directed content assets. FIG. 3 illustrates an example scenario in which a generic content asset 310(1), a generic content asset 310(2), a generic content asset 310(3), and a generic content asset 310(4) are intercalated between impressions 134(1) to 134(3) of respective directed content assets. In such a scenario, a queue generated in accordance with aspects of this disclosure can include records of the impressions 134(1) to 134(3).

Figure 4A:
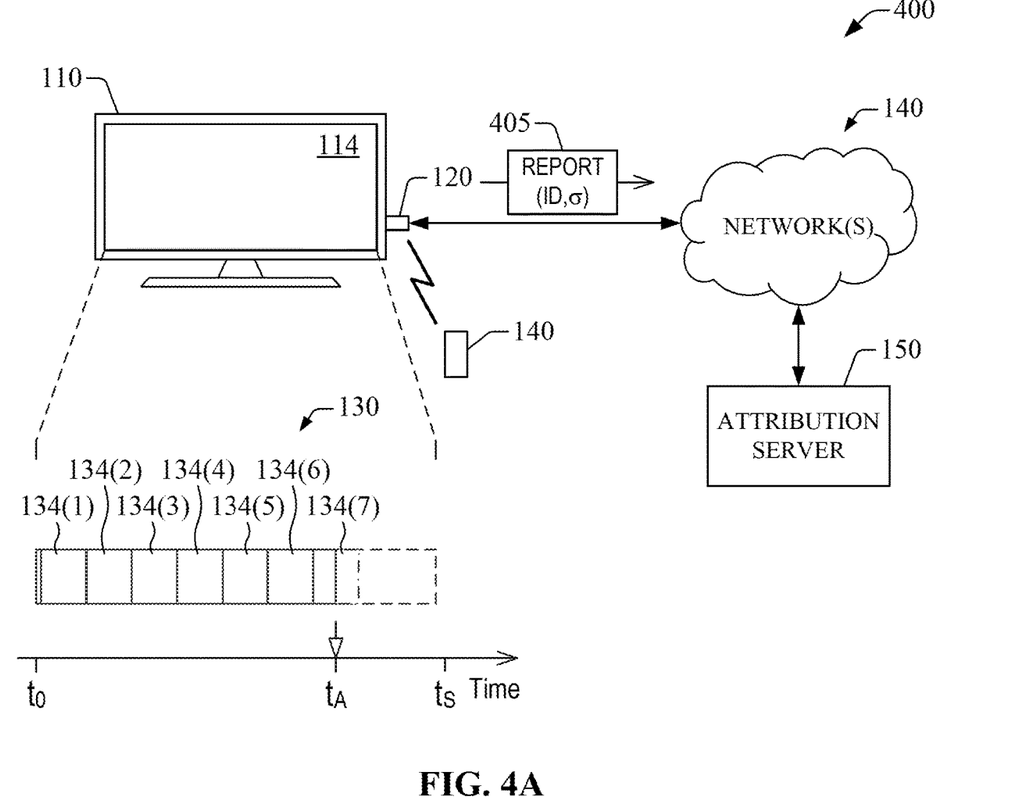
FIG. 4A illustrates an example of another operational environment for the reporting of engaged impressions of directed content, in accordance with one or more embodiments of this disclosure.

Embodiments of the technologies of this disclosure also can provide a mechanism to evaluate a degree to which an impression of a directed content asset within a content streaming service represents an engaged impression. More specifically, as is illustrated in the operational environment 400 shown in FIG. 4A, some embodiments of the disclosed technologies can assign an engagement score σ to an impression of a directed content asset within a screensaver session. The engagement score σ can represent a degree of certainty that the impression has been viewed.

Figure 4B:
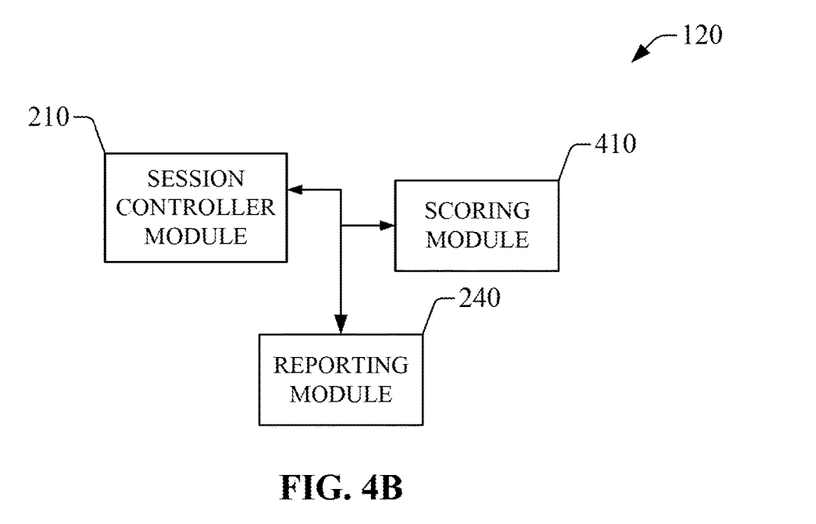
FIG. 4B illustrates an example of a computing architecture for the reporting of engaged impressions of directed content, in accordance with one or more embodiments of this disclosure.

Thus, rather than relying on queuing of viewable impressions and characterizing those viewable impressions as engaged impressions in response to user activity, the computing device 120 can report impressions on a per-impression basis—e.g., the impressions are reported as respective directed content assets are presented. In addition, the computing device 120 can also detect user activity after a directed content asset has been presented. As part of reporting an impression, the computing device 120 can send first data identifying a directed content asset and second data identifying an engagement score σ for the impression. The computing device 120 can send the first data and second data (both represented as report 405) to the attribution server device 150, by means of one or many of the network(s) 140. To that end, as is shown in FIG. 4B, an example architecture of the computing device 120 can include the reporting module 240.

The computing device 120 can determine the engagement score of an impression. To that end, the computing device 120 can evaluate a function s(•) that receives a time offset as the argument and yields a real value between 0 and a maximum value $S_M$. Such a real value defines the engagement score of the impression. In some configurations, the maximum value $S_M$ is equal 100. The time offset is associated with user activity during presentation of the directed content asset corresponding to the impression. Specifically, in one example, the time offset corresponds to the time interval elapsed from presentation of the directed content asset until the user activity is detected. In other words, the time offset can be defined as $\delta = t_A - t_d$, where $t_d$ is a time at which presentation of the directed content asset is initiated. The computing device 120 can determine the time offset $\delta$ and can then evaluate $s(\delta)$ to generate the engagement score. To that point, as is illustrated in FIG. 4B, an example architecture of the computing device 120 can include a scoring module 410 to determine $s(\delta)$. The scoring module 410 receive the time offset $\delta$ from the session controller module 210 and can compute the $s(\delta)$. In instances in which there are multiple user actions following an impression of a directed content asset, the scoring module 410 can evaluate s(•) using the least time offset.

Figure 5:
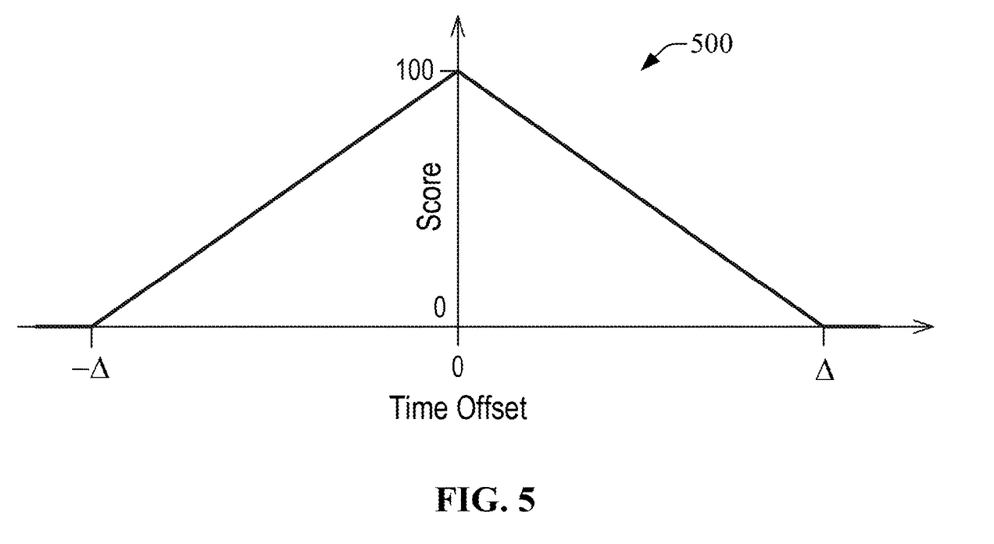
FIG. 5 illustrates an example of a function to generate an engagement score for an impression of directed content, in accordance with one or more embodiments of this disclosure.

Without intending to be bound by theory and/or modeling, the engagement score σ decreases as the magnitude of the time offset |δ| increases because user activity that occurs more quickly before or after presentation of a directed content asset can provide greater certainty that the impression of the directed content asset has been viewed. As such, in some embodiments, $s(0) = S_M$ and s(•) tends to zero as δ increases. As an illustration, as is shown in the diagram 500 in FIG. 5, the function s(•) can include a first linear function having a negative slope for positive time offsets, and a second linear function having a positive slope for negative time offsets and the null time offset. As is illustrated, the first and second linear functions yield $s(\Delta) = 0$ and $s(-\Delta) = 0$. The parameter Δ represents a threshold offset indicating that an end-user did not view the impression of the directed content asset. In instances in which user activity is absent after Δ following an impression of a directed content asset, the scoring module 410 can assign an engagement score σ=0 to the impression. The impression can be deemed not viewed with a null engagement score. In order to utilize network bandwidth more efficiently, the reporting module 240 can omit sending a report 405 for impressions having a null engagement score.

A magnitude of Δ can be determined empirically in some cases. In other cases, the magnitude of Δ can be machine-learned from historical feedback data defining a response to impressions of directed content assets. In one example configuration, Δ can be equal to 10 s and $s(\delta) = S_M - 10\delta$. Other functions that decrease to zero as |δ| approaches Δ also can be contemplated. The function $s(\delta)$ also can be machine-learned.

Figure 4C:
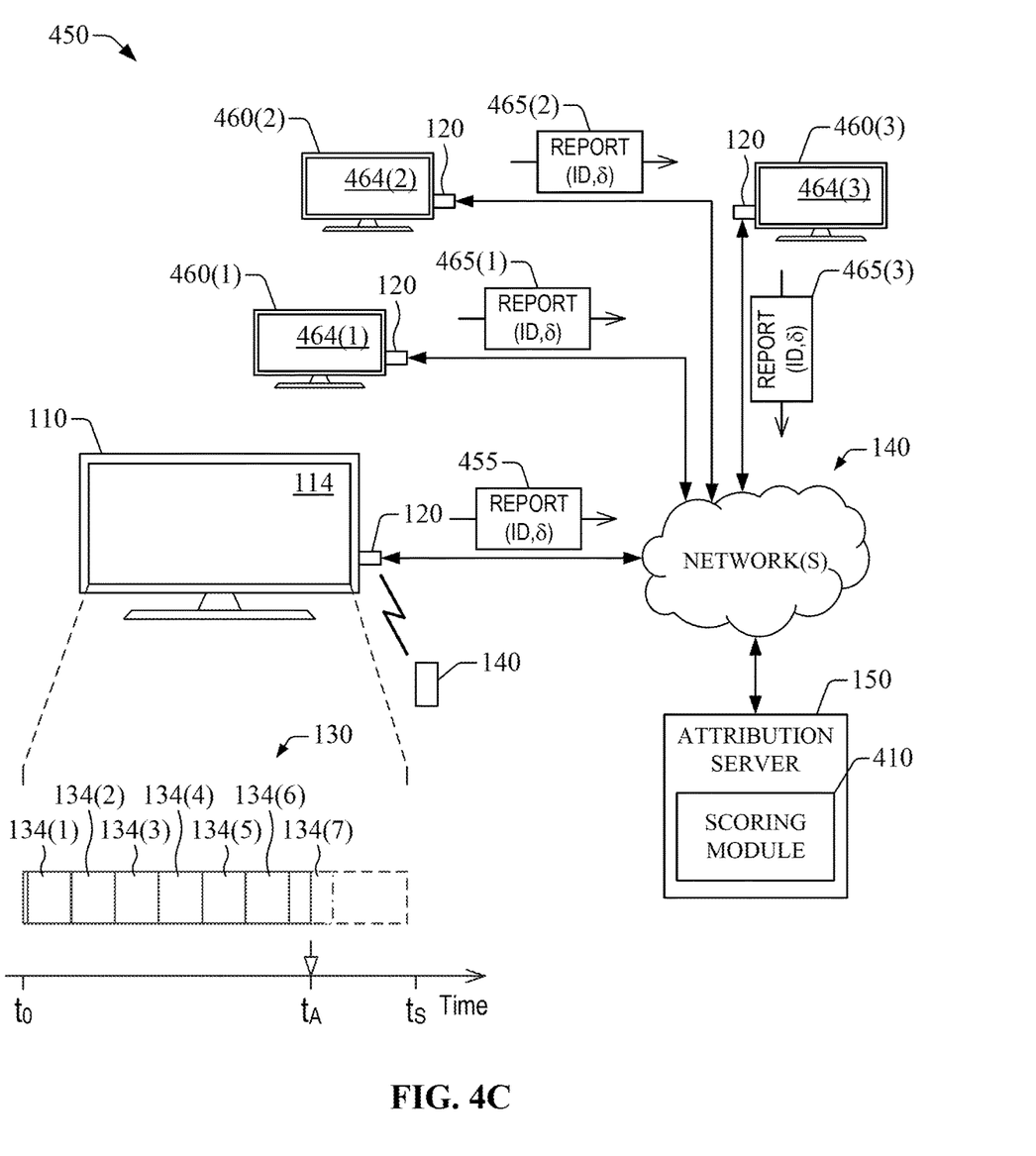
FIG. 4C illustrates an example of another operational environment for the reporting of engaged impressions of directed content, in accordance with one or more embodiments of this disclosure.

A determination of an engagement score σ also can be made in network domain instead of at a client device, such as the computing device 120. FIG. 4C illustrates an operational environment 450 for the reporting of engaged impressions of directed content, in accordance with one or more embodiments of the disclosure. During a series of presentations of directed content assets (see diagram 130), the computing device 120 can report impression data on a per-impression basis, as is discussed above. In the operational environment 450, rather than sending data identifying a directed content asset corresponding to an impression and an associated engagement score, the computing device 120 can send first data identifying the directed content asset and second data identifying a time offset δ corresponding to the impression of the directed content asset. The first data can include a code (e.g., a UUID) that uniquely identifies the directed content asset. The computing device 120 can send the first data and second data (both represented as report 455) to the attribution server device 150, by means of one or many of the network(s) 140.

As is illustrated in FIG. 4C, the attribution server 150 can include the scoring module 410. Thus, the attribution server 150 can determine, by means of the soring module 410, an engagement score σ for an impression of a directed content asset identified in the report 455, for a time offset δ also identified in the report 455. The scoring module 410 can determine the engagement score σ in accordance with aspects described herein. It is noted that, in some embodiments, the scoring module 410 can be included in another type of server device besides the attribution server 150.

Because the scoring module 410 is present in network domain, included in the attribution server 150, as is shown in FIG. 4C, a scoring function $\Sigma(\delta)$ can be readily changed without implementing changes in the computing device 120. As an example, $\Sigma(\delta)$ can be modified weekly, bi-weekly, or monthly. As another example, $\Sigma(\delta)$ can be modified over time in response to historical reports or other feedback data, or both, received from multiple computing devices 120. Those historical reports or other feedback data, or both, can be received from multiple computing devices 120 installed in respective television sets, for example. In one configuration, $\Sigma(\delta)$ can be modified by machine-learning an updated scoring function $\Sigma'(\delta)$. Regardless of the manner of updating $\Sigma(\delta)$, in some cases, $\Sigma(\delta) = s(\delta)$ described herein.

Further, also because the scoring module 410 is included in the attribution server 150 (or in another type of server device in a network platform), different computing devices 120 can have different scoring functions $\Sigma_d(\delta)$, where d uniquely identifies a computing device 120 or a user account, or both. The user account corresponds to the computing device 120 and identifies a subscriber of the content streaming service provided by the computing device 120, for example. In one configuration, a first scoring function $\Sigma_{d1}(\delta)$ can be configured for the computing device 120 functionally coupled to the television set 110; a second scoring function $\Sigma_{d2}(\delta)$ can be configured for the computing device 120 functionally coupled to the television set 460(1); a third scoring function $\Sigma_{d3}(\delta)$ can be configured for the computing device 120 functionally coupled to the television set 460(2); and a fourth scoring function $\Sigma_{d4}(\delta)$ can be configured for the computing device 120 functionally coupled to the television set 460(3). In some embodiments, the attribution server 150 can assign such scoring functions.

By configuring device-specific scoring functions $\Sigma_d(\delta)$ in network domain, different types of scoring can be applied to different audience segments. Those audience segments may have different types of responses to presentation of directed content assets during a screensaver session. Accordingly, a same time offset δ may correspond to different engagement scores in different audience segments.

Regardless of the manner of determining an engagement score σ, the scoring module 410 included in the attribution server 150 can determine a mean engagement score across multiple computing devices 120. The mean engagement score can assess a range of user activity in response to an impression of a directed content asset. Thus, the mean engagement score may be utilized to determine a billing rate for engaged impressions, where greater mean engagement scores result in greater billing rates.

Figure 6:
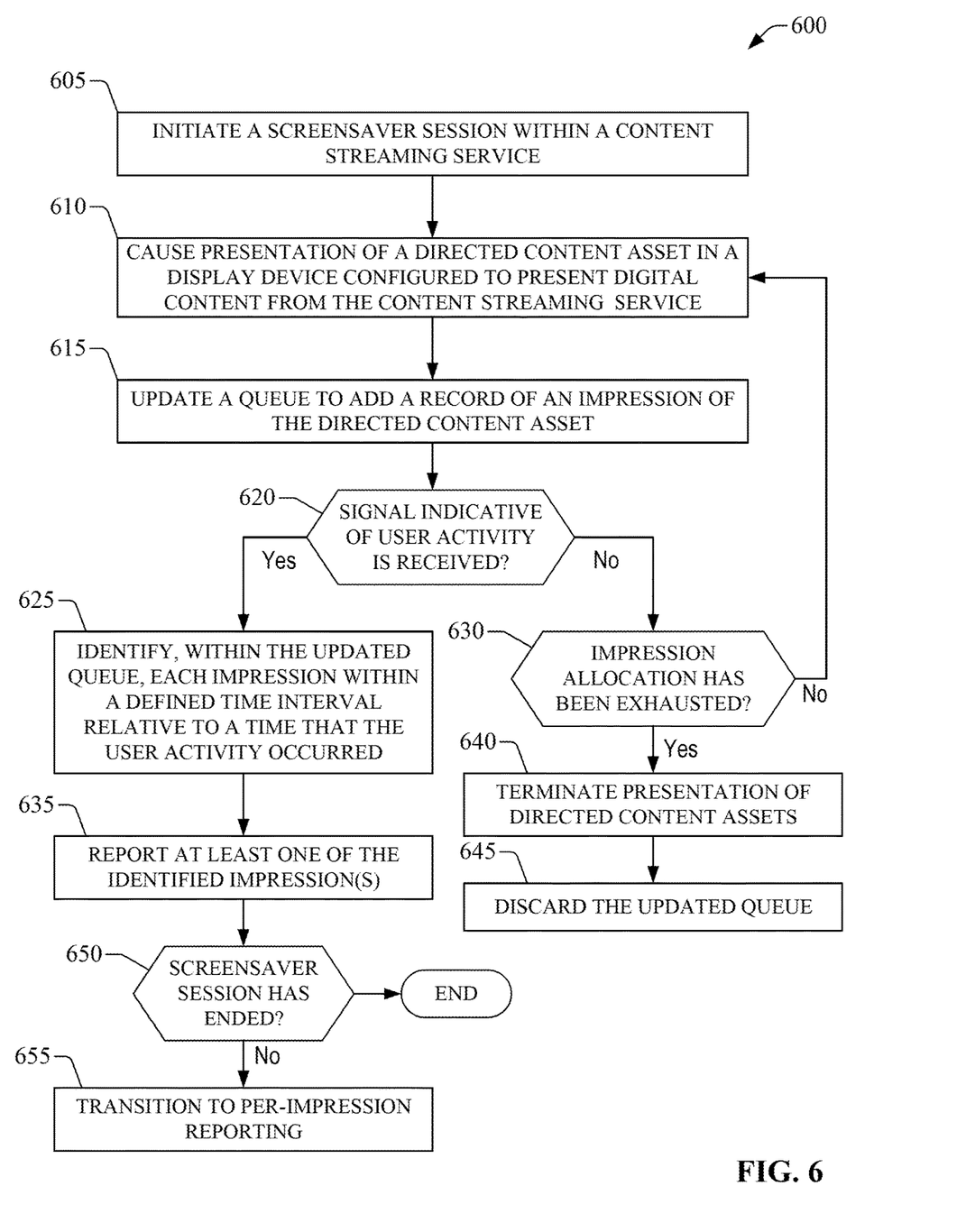
FIG. 6 illustrates an example of a method for reporting engaged impressions of directed content, according to one or more embodiments of this disclosure.

In view of the aspects of the techniques disclosed herein, an example method that can be implemented in accordance with this disclosure can be more readily appreciated with reference to the flowchart in FIG. 6. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action (s), may be required to implement a method in accordance with one or more aspects of the disclosure. Further yet, two or more of the disclosed methods or processes can be implemented in combination with each other, to accomplish one or more functionalities and/or advantages described herein.

The methods of the disclosure can be retained on an article of manufacture, or computer-readable non-transitory storage medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 6 is a flowchart of an example method 600 for reporting engaged impressions, according to one or more embodiments of this disclosure. The example method 600 can be implemented, entirely or partially, by a computing device having various computing resources. The computing device has at least one processor and/or is functionally coupled to at least one processor that can implement (e.g., compile, execute, compile and execute, etc.) one or more blocks of the example method 600. The computing device also can include one or many memory devices, other types of computing resources, or a combination thereof. Such processor(s), memory device(s), and computing resource(s), individually or in a particular combination, can permit the computing device to implement the example method 600, entirely or partially. The computing resources can include, for example, a firmware, an operating system; software or other program code; CPU(s) or other types of processing devices; interface(s) (I/O interface devices, programming interface(s) (such as APIs, etc.); a controller devices; a combination of the foregoing; or similar. The computing resources available to the computing device also can include downstream communication bandwidth and/or upstream communication bandwidth.

At block 605, the computing device can initiate a screensaver session within a content streaming service. At block 610, the computing device can cause presentation of a directed content asset in a display device (e.g., display device 114) configured to present digital content from the content streaming service.

At block 615, the computing device can update a queue to add a record of an impression of the directed content asset. At block 620, the computing device can determine if a signal indicative of user activity is received. In some embodiments, the user activity can include an interaction with a wireless device configured to control presentation of the digital content from the content streaming service on the display device. In other embodiments, the user activity can include an utterance directed to an intelligent assistance device, at least a portion of which may be integral to the computing device 120 and/or the remote-control device 140, configured to control the presentation of the digital content on the display device.

In response to a negative determination, at block 630, the computing device can determine if an impression allocation has been exhausted. The impression allocation defines a maximum number of impressions of directed content that can be presented during the screen server session. For example, the maximum number can be 9 or 15. The impression allocation can be specific to the screensaver session and, in some embodiments, different screensaver session can have different respective impression allocations.

In response to a determination that the impression allocation has not been exhausted, the flow of the example method 600 can return to block 610, at which block the computing device can cause presentation of another directed content asset. In the alternative, in response to a negative determination, the computing device can terminate presentation of directed content assets at block 640. A positive determination at block 620 can result in the flow of the example method 600 continuing to block 625. At that block, the computing device can identify, within the updated queue, each impression within a defined time interval $\Delta\tau$ (a real number in units of time) relative to a time to (another real number in units of time) that the user activity occurred.

At block 635, the computing device can report each identified impression. Reporting an identified impression can include sending data identifying the directed content asset (e.g., an advertisement) corresponding to the identified impression. The data can include a code (e.g., a UUID) that uniquely identifies the directed content asset. In some embodiments, rather than reporting each one of the impressions identified at block 625, the computing device can report a subset of the identified impressions.

At block 645, the computing device can determine if the screensaver session remains active. As mentioned, the screensaver session can be active for a defined time interval (e.g., 15 minutes) and is terminated after the time interval elapses. The example method 600 ends in response to the screensaver session having ended. In the alternative, in response to a negative determination, the computing device can transition to per-impression reporting at block 655.

Figure 7:
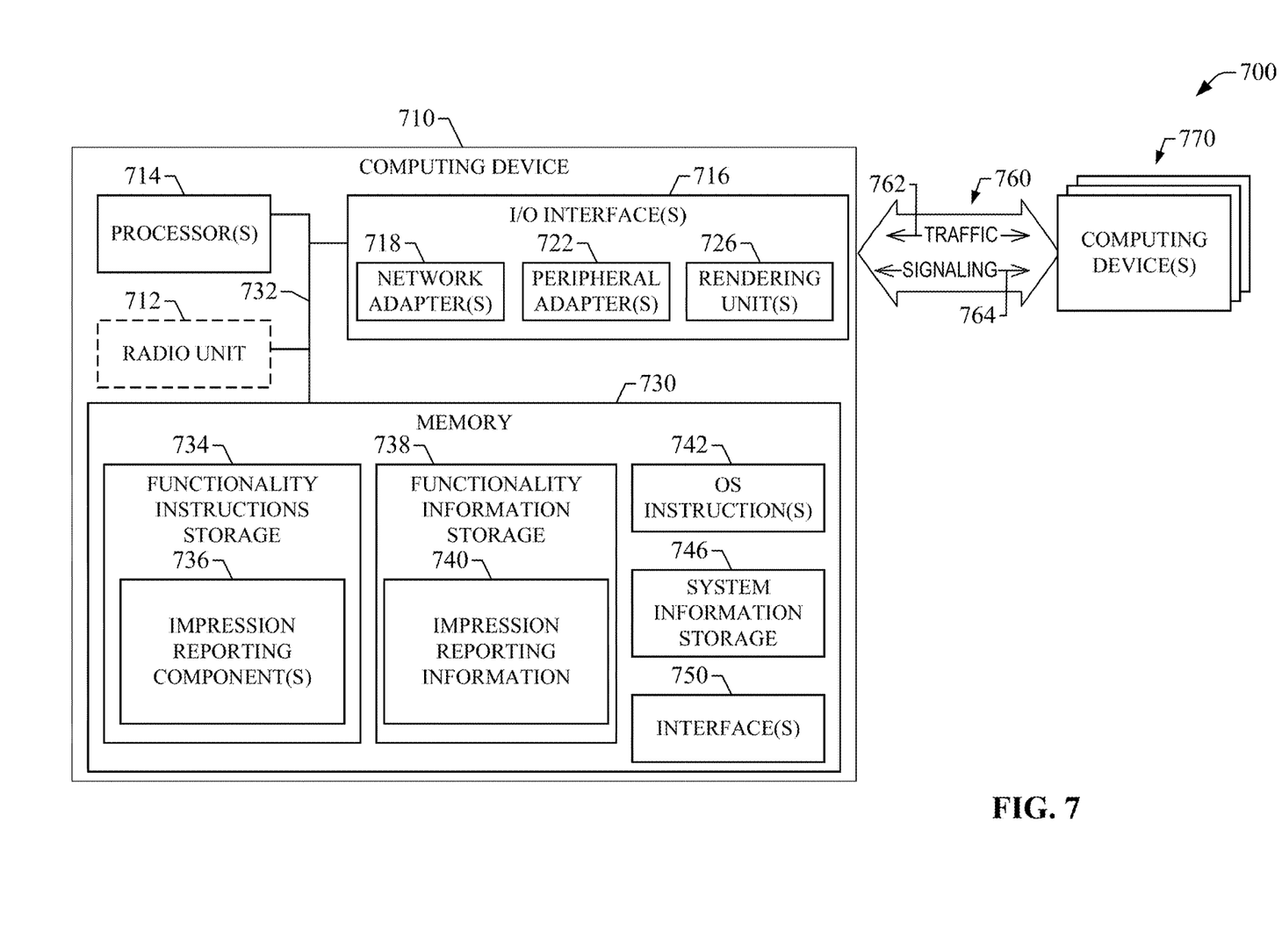
FIG. 7 illustrates an example of a computational environment for the reporting of engaged impressions, in accordance with one or more embodiments of the disclosure.

FIG. 7 illustrates a block diagram of an example computational environment 700 for automated generation of directed content campaigns, in accordance with one or more aspects of the disclosure. The example computational environment 700 is merely illustrative and is not intended to suggest or otherwise convey any limitation as to the scope of use or functionality of the computational environment's architecture. In addition, the illustrative computational environment depicted in FIG. 7 should not be interpreted as having any dependency or requirement relating to any one or combination of components illustrated in the example operational environments of the disclosure. The example computational environment 700 or portions thereof can embody, or can include, for example, the operational environment 100, the operational environment 400, or the operational environment 450, or a combination thereof.

The computational environment 700 represents an example implementation of the various aspects or elements of the disclosure in which the processing or execution of operations described in connection with the generation of points of insertion of directed content into a video asset disclosed herein can be performed in response to execution of one or many software components at the computing device 710. It should be appreciated that the one or many software components can render the computing device 710, or any other computing device that contains such components, a particular machine for generation of points of insertion of directed content into a video asset as is described herein, among other functional purposes. A software component can be embodied in or can include one or many computer-accessible instructions, e.g., computer-readable and/or computer-executable instructions. In one scenario, at least a portion of the computer-accessible instructions can embody and/or can be executed to perform at least a part of one or several of the example methods disclosed herein, such as the example method presented in FIG. 6.

For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 710 or other computing devices. Generally, such program modules include computer code, routines, programs, objects, components, information structures (e.g., data structures and/or metadata structures), etc., that can perform particular tasks (e.g., one or more operations) in response to execution by one or more processors, which can be integrated into the computing device 710 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or elements of the disclosure in connection with the generation of points of insertion of directed content into a video asset described herein can include personal computers; server computers; laptop devices; handheld computing devices; and multiprocessor systems. Additional examples can include set-top boxes, programmable consumer electronics, network personal computers (PCs), minicomputers, mainframe computers, blade computers, programmable logic controllers, distributed computing environments that include any of the above systems or devices, and the like.

As illustrated, the computing device 710 can include one or more processors 714, one or more input/output (I/O) interfaces 716, a memory 730, and a bus architecture 732 (also termed bus 732) that functionally couples various functional elements of the computing device 710. In certain embodiments, the computing device 710 can include, optionally, a radio unit 712. The radio unit 712 can include one or more antennas and a communication processing unit that can permit wireless communication between the computing device 710 and another device, such as one of the computing device(s) 770. The bus 732 can include at least one of a system bus, a memory bus, an address bus, or a message bus, and can permit exchange of information (data, metadata, and/or signaling) between the processor(s) 714, the I/O interface(s) 716, and/or the memory 730, or respective functional elements therein. In certain scenarios, the bus 732 in conjunction with one or more internal programming interfaces 750 (also referred to as interface(s) 750) can permit such exchange of information. In scenarios in which processor(s) 714 include multiple processors, the computing device 710 can utilize parallel computing.

The I/O interface(s) 716 can permit communication of information between the computing device and an external device, such as another computing device, e.g., a network element or an end-user device. Such communication can include direct communication or indirect communication, such as exchange of information between the computing device 710 and the external device via a network or elements thereof. As illustrated, the I/O interface(s) 716 can include one or many of network adapter(s) 718, peripheral adapter(s) 722, and rendering unit(s) 726. Such adapter(s) can permit or facilitate connectivity between the external device and one or more of the processor(s) 714 or the memory 730. For example, the peripheral adapter(s) 722 can include a group of ports, which can include at least one of parallel ports, serial ports, Ethernet ports, V.35 ports, or X.21 ports. In certain embodiments, the parallel ports can include General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 718 can functionally couple the computing device 710 to one or many computing devices 770 via one or more traffic and signaling pipes 760 that can permit or facilitate exchange of traffic 762 and signaling 764 between the computing device 710 and the one or many computing devices 770. Such network coupling provided at least in part by the at least one of the network adapter(s) 718 can be implemented in a wired environment, a wireless environment, or both. The information that is communicated by the at least one of the network adapter(s) 718 can result from the implementation of one or more operations of a method in accordance with aspects of this disclosure. Such output can be any form of visual representation, including, but not limited to, textual, graphical, animation, audio, tactile, and the like. In certain scenarios, each one of the computing device(s) 770 can have substantially the same architecture as the computing device 710. In addition, or in the alternative, the display unit(s) 726 can include functional elements that can permit control of the operation of the computing device 710, or can permit revealing the operational conditions of the computing device 710. Such functional elements can include, for example, lighting devices, such as light-emitting diodes; a display device, such as a liquid crystal display (LCD), a plasma monitor, a light emitting diode (LED) monitor, or an electrochromic monitor; combinations thereof; or similar elements.

In one aspect, the bus 732 represents one or many of several types of bus structures, including a memory bus or a memory controller, a peripheral bus, an accelerated graphics port, and a processor or local bus using any of various bus architectures. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 732, and all buses described herein can be implemented over a wired or wireless network connection and each of the subsystems, including the processor(s) 714, the memory 730 and memory elements therein, and the I/O interface(s) 716 can be contained within one or more remote computing devices 770 at physically separate locations, connected through buses of this form, in effect implementing a fully distributed system. In certain embodiments, such a distributed system can implement the functionality described herein in a client-host or client-server configuration in which the impression reporting component(s) 736 or the impression reporting information 740, or both, can be distributed between the computing device 710 and at least one of the computing device(s) 770, and the computing device 710 and at least one of the computing device(s) 770 can execute such components and/or leverage such information.

The computing device 710 can include a variety of computer-readable media. Computer-readable media can be any available media (transitory and non-transitory) that can be accessed by a computing device. In one aspect, computer-readable media can include computer non-transitory storage media (or computer-readable non-transitory storage media) and communications media. As such, computer-readable non-transitory storage media can be any available media that can be accessed by the computing device 710, and can include, for example, both volatile and non-volatile media, and removable and/or non-removable media. In one aspect, the memory 730 can include computer-readable media in the form of volatile memory, such as random access memory (RAM), and/or non-volatile memory, such as read-only memory (ROM).

As is illustrated in FIG. 7, the memory 730 can include functionality instructions storage 734 and functionality information storage 738. The functionality instructions storage 734 can include computer-accessible instructions that, in response to execution (by at least one of the processor(s) 714), can implement one or more of the functionalities of the technologies disclosed herein. The computer-accessible instructions can embody, or can include, one or many software components illustrated as impression reporting component(s) 736. In one scenario, execution of at least one component of the impression reporting component(s) 736 can implement one or several of the methods described herein, such as the example method 600. For instance, such execution can cause a processor (e.g., one of the processor(s) 714) that executes the at least one component to carry out one or a combination of the disclosed techniques (including the example method 500). It is noted that, in one aspect, a processor of the processor(s) 714 that executes at least one of the impression reporting component(s) 736 can retrieve information from or retain information within one or many memory elements 740 in the functionality information storage 738 in order to operate in accordance with the functionality programmed or otherwise configured by the directed content generation component(s) 736. The one or many memory elements 740 may be referred to as impression reporting information 740. Such information can include at least one of code instructions, information structures, or the like.

In some embodiments, one or many components of the impression reporting component(s) 736 can embody, or can be part of, at least one of the session controller module 210, the queue generator module 220, or the reporting module 240. As such, the one or many components can operate in accordance with, and can provide the functionality of, the session controller module 210, the queue generator module 220, and the reporting module 240 in accordance with aspects described in this disclosure. In other embodiments, one or many of the impression reporting component(s) 736 in combination with at least one of the processor(s) 714 can embody or can constitute at least one of session controller module 210, the queue generator module 220, or the reporting module 240, and can operate in accordance with, and can provide the functionality of, such units in accordance with aspects described in this disclosure.

At least one of the one or more interfaces 750 (e.g., application programming interface(s)) can permit or otherwise facilitate communication of information between two or more components within the functionality instructions storage 734. The information that is communicated by the at least one interface can result from implementation of one or many operations in a method of this disclosure. In some embodiments, the functionality instructions storage 734 or the functionality information storage 738, or both, can be embodied in or can include removable/non-removable, and/or volatile/non-volatile computer storage media.

At least a portion of at least one of the impression reporting component(s) 736 or item acquisition information 740 can program or otherwise configure one or many of the processors 714 to operate at least in accordance with the functionality described herein. One or many of the processor(s) 714 can execute at least one of the impression reporting component(s) 736 and utilize at least a portion of the information in the functionality information storage 738 in order to generate points of insertion of directed content into a video asset in accordance with one or more aspects described herein.

It should be appreciated that, in some scenarios, the functionality instruction(s) storage 734 can embody, or can include, a computer-readable non-transitory storage medium having computer-accessible instructions that, in response to execution, cause at least one processor (e.g., one or several of the processor(s) 714) to perform a group of operations including the operations or blocks described in connection with the disclosed methods.

In addition, the memory 730 can include computer-accessible instructions and information (e.g., data, metadata, and/or programming code instructions) that permit or facilitate the operation and/or administration (e.g., upgrades, software installation, any other configuration, or the like) of the computing device 710. Accordingly, as illustrated, the memory 730 can include a memory element 742 (labeled operating system (OS) instruction(s) 742) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 710 can dictate a suitable OS. The memory 730 also includes system information storage 746 having data, metadata, and/or programming code that permits or facilitates the operation and/or administration of the computing device 710. Elements of the OS instruction(s) 742 and the system information storage 746 can be accessible or can be operated on by at least one of the processor(s) 714.

It should be recognized that while the functionality instructions storage 734 and other executable program components, such as the OS instruction(s) 742, are illustrated herein as discrete blocks, such software components can reside at various times in different memory components of the computing device 710, and can be executed by at least one of the processor(s) 714. In certain scenarios, an implementation of the impression reporting component(s) 736 can be retained on or transmitted across some form of computer-readable media.

The computing device 710 and/or one of the computing device(s) 770 can include a power supply (not shown), which can power up components or functional elements within such devices. The power supply can be a rechargeable power supply, e.g., a rechargeable battery, and can include one or more transformers to achieve a power level suitable for the operation of the computing device 710 and/or one of the computing device(s) 770, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 718) to connect operationally to the conventional power grid. In another aspect, the power supply can include an energy conversion component, such as a solar panel, to provide additional or alternative power resources or autonomy for the computing device 710 and/or one of the computing device(s) 770.

The computing device 710 can operate in a networked environment by utilizing connections to one or many remote computing devices 770. As an illustration, a remote computing device can be a personal computer, a portable computer, a server, a router, a network computer, a peer device or other common network node, or similar. As is described herein, connections (physical and/or logical) between the computing device 710 and a computing device of the one or many remote computing devices 770 can be made via one or more traffic and signaling pipes 760, which can include wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 770) that are functionally coupled (e.g., communicatively linked or otherwise coupled) through a network having traffic and signaling pipes and related network elements. In a distributed computing environment, in one aspect, one or more software components (such as program modules) can be located in both a local computing device 710 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. A processor can constitute a central processing unit (CPU), a graphics processing unit (GPU), or a tensor processing unit (TPU). Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or include non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can include solid state drives, hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAIVI), and direct Rambus RAM (DRRAM). The disclosed memory components or memories of operational environments described herein are intended to include one or many of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques for reporting engaged impressions of directed content. It is, of course, not possible to describe every conceivable combination of elements and/or method for purposes of describing the various features of this disclosure, but it can be recognized that many further combinations and permutations of the disclosed features are possible. Accordingly, it may be apparent that various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:
    initiating, by a computing device comprising at least one processor, a screensaver session within a connected television service, the screensaver session having a defined duration and the computing device being configured to provide the connected television service;
    causing, by the computing device, presentation of a first directed content asset on a display device configured to present digital content from the connected television service, the display device functionally coupled to the computing device;
    updating, by the computing device, a queue to add a first record of an impression indicating the first directed content asset was presented on the display device, the queue retained in a memory device of the computing device;
    causing, by the computing device, presentation of a second directed content asset on the display device;
    updating, by the computing device, the queue to add a second record of an impression indicating the second directed content asset was presented on the display device;
    receiving, by the computing device, a signal indicative of user activity; and
    based on receiving the signal indicative of the user activity:
        obtaining the first record from the queue;
        determining, by the computing device, using the first record obtained from the queue, that the first directed content asset was presented within a defined time interval relative to a time that the user activity occurred;

obtaining the second record from the queue;

determining, by the computing device, using the second record obtained from the queue, the second directed content asset was presented within the defined time interval relative to the time that the user activity occurred;

sending, by the computing device, to an attribution server device, first data identifying the first directed content asset; and sending, by the computing device, to the attribution server device, second data identifying the second directed content asset.

2. The method of claim 1, wherein the user activity comprises an interaction with a remote-control device configured to control presentation of the digital content on the display device.

3. The method of claim 1, wherein the defined time interval is equal to or less than the duration of the screensaver session.

4. The method of claim 1, further comprising:
terminating the screensaver session based on the receiving of the signal indicative of the user activity.

5. The method of claim 1, wherein the defined time interval is equal to the duration of the screensaver session, the method further comprising,
determining, by the computing device, that the screensaver session remains active;
causing, by the computing device, presentation of a third directed content asset on the display device; and
sending, by the computing device, to the attribution server device, data identifying the third directed content asset.

6. A method, comprising:
initiating, by a computing device comprising at least one processor, a screensaver session within a content streaming service;
causing, by the computing device, presentation of a directed content asset on a display device functionally coupled to the computing device;
updating, by the computing device, a queue to add a record of an impression indicating presentation of the directed content asset, the queue retained in a memory device of the computing device;
receiving, by the computing device, a signal indicative of user activity; and
in response to receiving the signal indicative of the user activity:
determining, by the computing device, using the record added to the queue, that the presentation of the directed content asset occurred within a time interval relative to a time that the user activity occurred; and
sending, by the computing device, data identifying the directed content asset.

7. The method of claim 6, wherein the user activity comprises an interaction with a wireless device configured to control presentation of the digital content on the display device.

8. The method of claim 7, wherein the causing the presentation of the directed content asset comprises causing presentation of a selectable visual element identifying an action, and wherein the interaction comprises selection of the selectable visual element.

9. The method of claim 6, wherein the user activity comprises an utterance directed to an intelligent assistance device configured to control the presentation of the digital content on the display device.

10. The method of claim 6, further comprising:
causing, by the computing device, presentation of a second directed content asset on the display device functionally coupled to the computing device;
updating, by the computing device, the queue to add a second record of a second impression indicating presentation of the second directed content asset;
in response to receiving the signal indicative of the user activity:
determining, by the computing device and using the second record added to the queue, that the presentation of the second directed content asset occurred outside the time interval relative to the time that the user activity occurred; and
based on the determination that the presentation of the second directed content asset occurred outside the time interval relative to the time that the user activity occurred, determining that the second content was not viewed.

11. The method of claim 6, wherein determining that the presentation of the directed content asset occurred within the time interval relative to the time that the user activity occurred comprises:
determining a time at which the presentation of the directed content asset was initiated; and
determining an engagement score for the impression that is computed based at least in part on the time at which the presentation of the directed content asset was initiated and the time that the user activity occurred.

12. The method of claim 6, wherein the defined time interval is equal to a duration of the screensaver session, the method further comprising,
determining, by the computing device, that the screensaver session remains active;
causing, by the computing device, presentation of a second directed content asset on the display device; and
sending, by the computing device, data identifying the second directed content asset.

13. The method of claim 6, further comprising causing presentation of a generic content asset successive to the presentation of the directed content asset, the generic content asset comprising digital media independent from the content streaming service.

14. A computing device, comprising:
at least one processor; and
at least one memory device having computer-executable instructions stored thereon that, in response to execution by the at least one processor, cause the computing system to perform operations comprising:
initiating a screensaver session within a content streaming service;
causing presentation of a directed content asset on a display device functionally coupled to the computing device;
updating a queue to add a record of an impression indicating presentation of the directed content asset, the queue retained in a memory device of the computing device;
receiving a signal indicative of user activity; and
in response to receiving the signal indicative of the user activity:
determining, using the record added to the queue, that the presentation of the directed content asset occurred within a defined time interval relative to a time that the user activity occurred; and
sending data identifying the directed content asset.

15. The computing device of claim 14, wherein the user activity comprises an interaction with a wireless device configured to control presentation of the digital content on the display device.

16. The computing device of claim 15, wherein the causing the presentation of the directed content asset comprises causing presentation of a selectable visual element identifying an action, and wherein the interaction comprises selection of the selectable visual element.

17. The computing device of claim 14, wherein the user activity comprises an utterance directed to an intelligent assistance device configured to control the presentation of the digital content on the display device.

18. The computing device of claim 14, wherein the defined time interval is equal to or less than a duration of the screensaver session.

19. The method of claim 10, wherein a magnitude of defined time interval is in a range from about 0 to about 15 minutes.

20. The computing device of claim 14, wherein the defined time interval is equal to a duration of the screensaver session, the method further comprising,
- determining, by the computing device, that the screensaver session remains active;
- causing, by the computing device, presentation of a second directed content asset on the display device; and
- sending, by the computing device, data identifying the second directed content asset.

\* \* \* \* \*